Patented Dec. 11, 1928.

1,694,568

UNITED STATES PATENT OFFICE.

HERMANN WAGNER, OF SODEN-ON-THE-TAUNUS, AND HEINZ EICHWEDE AND ERICH FISCHER, OF HOCHST-ON-THE-MAIN, GERMANY, ASSIGNORS TO GRASSELLI DYESTUFF CORPORATION, OF NEW YORK, N. Y., A CORPORATION OF DELAWARE.

AZO DYES AND PROCESS OF MAKING SAME.

No Drawing. Application filed December 22, 1925, Serial No. 77,097, and in Germany August 6, 1923.

The present invention relates to new azo dyestuffs and to a process of preparing the same; more particularly it relates to the azo dyestuffs of the general formula:

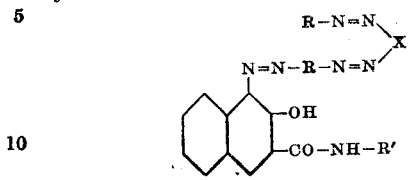

wherein R represents a non-sulfonated phenyl group, R' a non-sulfonated aryl residue, and X a non-sulfonated residue of the group including the benzene and naphthalene series being substituted by at least one auxochromic group.

We wish it to be understood that in the above given formula all aryl radicles may be further substituted.

Our products form in the dry state black powders being insoluble in water and yielding dyeings of excellent properties as to fastness. In some cases the fastness of the dyeings can be considerably enhanced by an after-treatment with a copper salt.

Our products are obtainable, for instance, by diazotizing a compound of the general formula:

wherein R represents a non-sulfonated phenyl group and X a non-sulfonated residue of the group including the benzene and naphthalene series being substituted by at least one auxochromic group and coupling the diazo compound thus obtained with an arylamide of 2-hydroxy-naphthalene-3-carboxylic acid. The coupling process can be effected either in substance or in the presence of a substratum or on the fiber.

The following examples serve to illustrate our invention:

(1) 33,1 parts by weight of the disazo dyestuff:

one mol. of aniline ⟶ one mol. m-phenylenediamine
one mol. of p-phenylenediamine which is obtained by acting with one molecule of diazotized p-nitraniline upon the monoazo dyestuff produced by combining one molecule of diazobenzene chloride with one molecule of m-phenylenediamine and subsequently reducing the nitro group with sodium sulfide, are diazotized with 25–30 parts by volume of hydrochloric acid of 20° Bé. and 7 parts by weight of sodium nitrite. This diazo solution is run into a solution of 33 parts of the 5-chloro-1-methyl-2-anilide of 2-hydroxynaphthalene-3-carboxylic acid dissolved with caustic soda solution and sodium acetate in excess. The dyestuff after being filtered off and dried, is ground in the usual manner with a substratum. The latter may also be added already in the course of the coupling process.

The dyestuff has the formula:

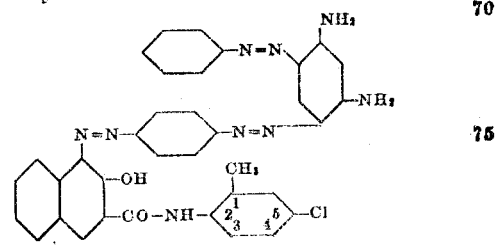

The copulation of the disazo dyestuff used in the foregoing example can be largely varied; there may, for instance, be used instead of aniline: para-chloraniline, para-toluidine, 2-amino-1-phenetol, or 2-chloro-4-amino-1-anisol; instead of para-nitraniline: 2-chlor-4-nitraniline, 5-nitro-2-amino-1-methyl-benzene, 5-nitro-4-chlor-2-amino-1-anisol; instead of m-phenylene diamine: m-toluylenediamine, m-aminodimethylaniline, 2-amino-4-dimethyltoluidine (1-CH₃,2-NH₂,4-N(CH₃)₂), 2,3-dihydroxynaphthalene, α-naphthol, 2-amino-7-hydroxynaphthalene. Furthermore the 5-chlor-1-methyl-2-anilide of 2-hydroxynaphthalene-3-carboxylic acid mentioned in the foregoing example, may be replaced by any arylamide of 2-hydroxynaphthalene-3-carboxylic acid.

In case of the use of 2.3-dihydroxynaphthalene the intermediate product has the following constitution:

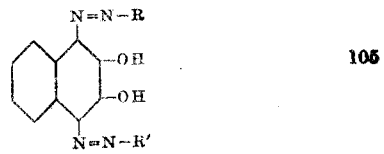

and with 2-amino-7-hydroxynaphthalene the following constitution:

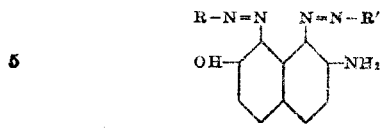

R and R' being the same or different residues of azo compounds, at least one of them being diazotable.

(2) 100 grams of cotton yarn are impregnated with a solution containing per liter 23,8 grams of the 2-naphthalid of 2-hydroxynaphthalene-3-carboxylic acid, 54 cc. of caustic soda solution of 34° Bé. and 60 cc. of Turkey-red oil. The yarn after being thus prepared is passed through a second bath containing per liter 8.4 grams of the following diazocompound:

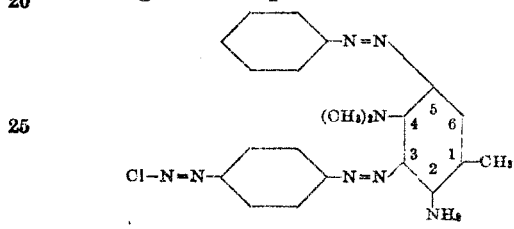

neutralized with sodium acetate, sodium carbonate or chalk.

After the material has been wrung out, rinsed and soaped, a deep black dyeing of excellent fastness is obtained.

The dyestuff has the formula:

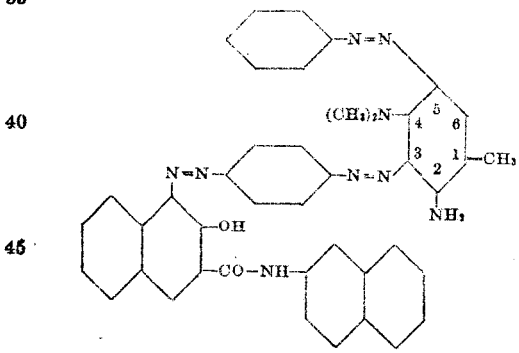

(3) The material to be dyed is first padded with a solution of 28 gr. of 5-chloro-1-methyl-2-anilid of 2-hydroxynaphthalene-3-carboxylic acid, 90 cc. of caustic soda solution 22° Bé., 20 gr. of para soap P. N. (ammonium ricinoleate), made up to one litre.

The material thus prepared, after being dried, is printed with a paste made as follows:

Dissolve:

56 gr. of the dyestuff produced by:
1 mol. aniline
1 mol. p-phenylenediamine → 1 mol. 2-amino-4-dimethyl-toluidine (1—CH₃, 2—NH₂, 4—N(CH₃)₂)

in 36 cc. of hydrochloric acid 22° Bé. and 200 cc. of water, cool with 150 gr. of ice, diazotize with 11 gr. of sodium nitrite dissolved in 30 gr. of water; introduce the resulting diazo solution, while stirring into 500 gr. of tragacanth 65:1000 and add before use 30 gr. of sodium acetate about one litre.

The prints thus obtained are distinguished by their good properties as to fastness.

The dyestuff has the formula:

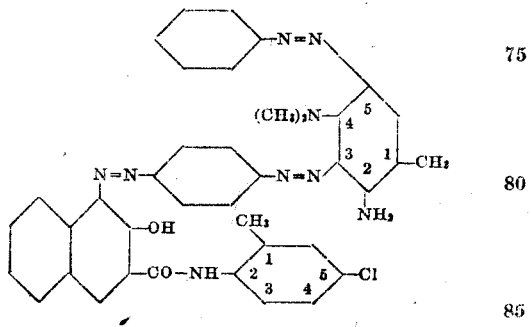

In the foregoing Examples 2 and 3 the disazo dyestuff to be diazotized as well as the arylamide of 2-hydroxynaphthalene-3-carboxylic acid, may be varied in the manner indicated in Example 1. The dyeings and prints thus obtained are deep black and possess very good and even excellent properties as to fastness.

(4) 34,6 parts of the disazo dyestuff:

2 mol. of p-phenylenediamine ⇌ m-phenylenediamine obtained by coupling 2 mol. of diazotized p-nitraniline with 1 mol. of m-phenylenediamine and subsequently reducing the dinitro-dyestuff with sodium sulfide, are diazotized with 50–60 parts of hydrochloric acid of 20° Bé. and 14 parts of nitrite. The clear diazo solution is run into a solution of 52,6 parts of the anilide of 2-hydroxynaphthalene-3-carboxylic acid dissolved with caustic soda solution and sodium acetate in excess. After having filtered the mixture and dried, a black powder is obtained which is combined in the usual manner with a substratum. The coupling process may also be operated in presence of the substratum.

The dyestuff has the formula:

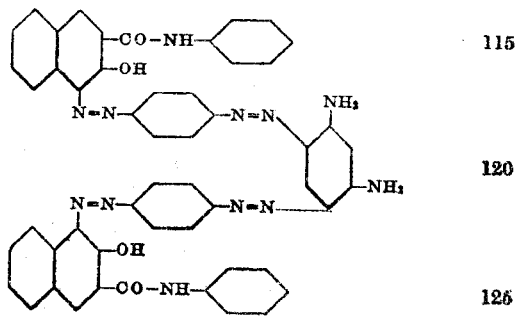

The preparation of the dyestuff may be carried out in an analogous manner if, instead of the disazo dyestuff used in the foregoing example, there are used as parent products for instance dyestuffs of the following constitution:

2 mol. of p-phenylenediamine ⇌ 1 mol. of m-toluylenediamine
2 mol. of p-phenylenediamine ⇌ 1 mol. of 1-5-naphthylendiamine
2 mol. of p-phenylenediamine ⇌ 1 mol. of m-aminodimethylaniline
2 mol. of p-phenylenediamine ⇌ 1 mol. of tetramethyl-1-3-diaminobenzene
2 mol. of p-phenylenediamine ⇌ 1 mol. of m-aminophenol
2 mol. of p-phenylenediamine ⇌ 1 mol. of 2.5-aminonaphthol
2 mol. of p-phenylenediamine ⇌ 1 mol. of 2.3-dihydroxynaphthalene etc.

In case of the use of 2 mol. of p-phenylenediamine ⇌ 1 mol. of 1.5-naphthylenediamine and 2 mol. of p-phenylenediamine ⇌ 1 mol. m-aminophenol, the intermediate products have the following constitutions.

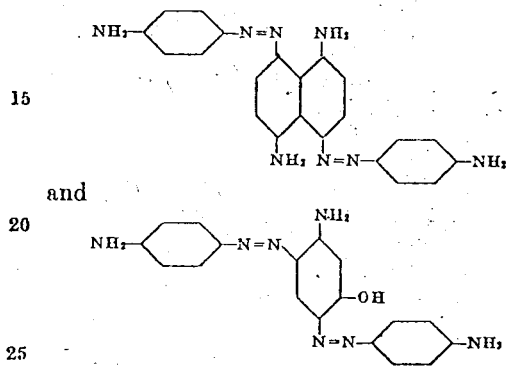

and

Instead of the p-phenylenediamine may be used 2 mol. of any other diamine such for instance as 2-5-diamino-1-methylbenzene, 2-5-diamino-1-methoxybenzene, 2,5-diamino-1-hydroxybenzene, 2.5-diamino-1-benzoic acid, or the like; while the anilide of the 2-hydroxynaphthalene-3-carboxylic acid mentioned in the foregoing example may be replaced by any arylamide of 2-hydroxynaphthalene-3-carboxylic acid.

(5) 100 grams of cotton yarn are impregnated with a solution containing per litre 11,9 grams of the 5-chloro-1-methyl-2-anilide of 2-hydroxynaphthalene-3-carboxylic acid, 30 cc. of caustic soda solution of 34° Bé.

and 40 cc. of sodium Turkey red oil. The yarn is then passed through a second bath containing per liter 4.4 grams of the following tetrazo compound

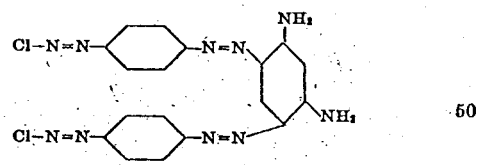

neutralized with sodium acetate.

In this manner black dyeings of excellent fastness are obtained.

The dyestuff has the formula:

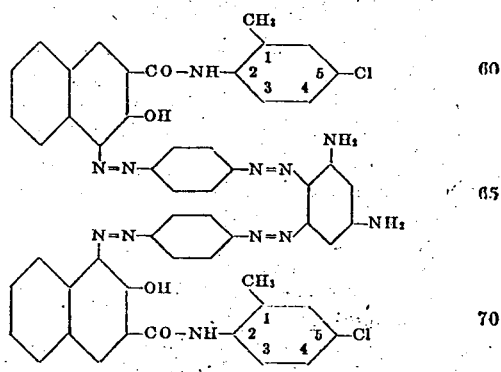

(6) The material is padded with a solution of: 24,9 grams of 4-chloro-1-methoxy-2-anilide of 2-hydroxynaphthalene-3-carboxylic acid, 80 cc. of caustic soda solution of 22° Bé., 20 grams of para soap P. N., made up to one litre.

The material is then dried and printed with a paste made up as follows:
Dissolve:

18 grams of the dyestuff : 2 mol. of p-phenylenediamine →  
1 mol. of m-toluylenediamine in 140 cc. of water and 24 cc. of hydrochloric acid 22° Bé., cool with 150 gr. of ice, tetrazotize with 8 gr. of nitrite dissolved in 50 cc. of water; then introduce the whole while stirring into 524 gr. of tragacanth 60:1000 and add before use 60 gr. of sulfate of aluminum 1:1 and 20 gr. of sodium phosphate, about one litre.

The deep black prints thus obtained are distinguished for their very good fastness.

The dyestuff has the formula:

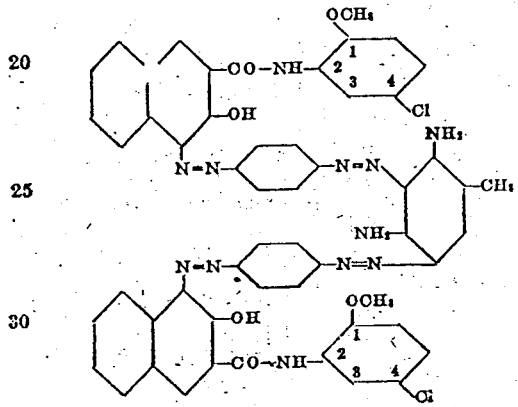

In the foregoing Examples 5 and 6 there may, just as in Example 4, be varied in the manner above indicated both the disazo dyestuff to be tetrazotized and the arylamide of 2 - hydroxynaphthalene - 3 - carboxylic acid; thus there are obtained in most cases intense deep black dyeings or prints of very good properties as to fastness.

In the following claims the terms "non-sulfonated phenyl group", "non-sulfonated aryl residue", and "non-sulfonated residue of the group including the benzene and naphthalene series" are intended to include such unsulfonated groups or residues, whether they are substituted by other substituents than sulfonic acid groups or not, except as otherwise specifically limited in the claims.

We claim:

1. As new products the azo dyestuffs of the general formula:

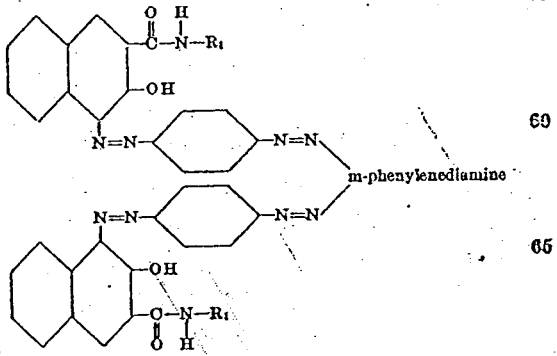

wherein $R_1$ represents a non-sulfonated aryl residue.

2. As a new product the azo dyestuff of the most probable formula:

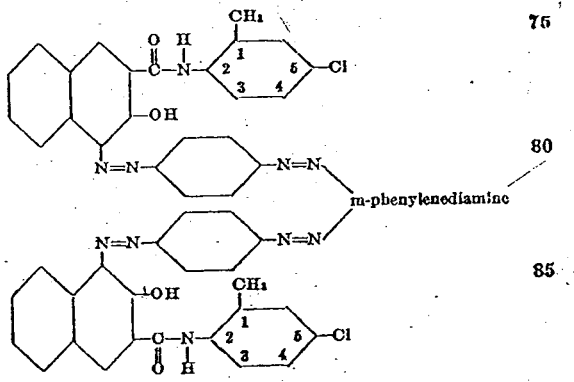

being in the dry state a deep-black powder insoluble in water and yielding a dyeing of excellent properties as to fastness.

3. Material dyed with the dyestuff of claim 1.

4. Material dyed with the dyestuff of claim 2.

5. As new products the dyestuffs of the general formula:

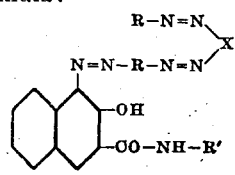

wherein R represents a non-sulfonated phenyl group, R' a non-sulfonated aryl residue, and X a non-sulfonated residue of the group including the benzene and naphthalene series being substituted by at least one auxochromic group.

In testimony whereof, we affix our signatures.

HERMANN WAGNER.
HEINZ EICHWEDE.
ERICH FISCHER.

3. Material dyed with the dyestuff of claim 1.

4. Material dyed with the dyestuff of claim 2.

5. As new products the dyestuffs of the general formula:

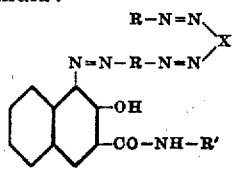

wherein R represents a non-sulfonated phenyl group, R' a non-sulfonated aryl residue, and X a non-sulfonated residue of the group including the benzene and naphthalene series being substituted by at least one auxochromic group.

In testimony whereof, we affix our signatures.

HERMANN WAGNER.
HEINZ EICHWEDE.
ERICH FISCHER.

CERTIFICATE OF CORRECTION.

Patent No. 1,694,568.                    Granted December 11, 1928, to

HERMANN WAGNER ET AL.

It is hereby certified that error appears in the printed specification of the above numbered patent requiring correction as follows: Page 5, after line 19, insert the following as claim 6:

6. Material dyed with the dyestuffs of claim 5.;

and that the said Letters Patent should be read with this correction therein that the same may conform to the record of the case in the Patent Office.

Signed and sealed this 15th day of January, A. D. 1929.

(Seal)

M. J. Moore,
Acting Commissioner of Patents.